(No Model.)
W. D. PATTERSON.
HOSE COUPLING.
No. 464,386. Patented Dec. 1, 1891.
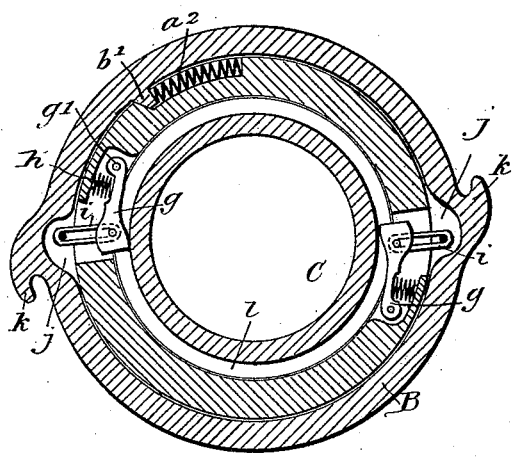
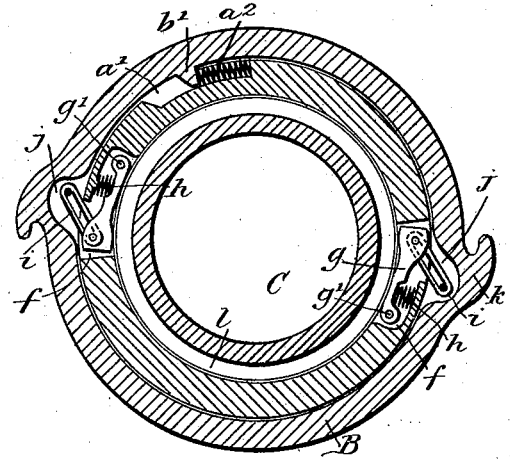
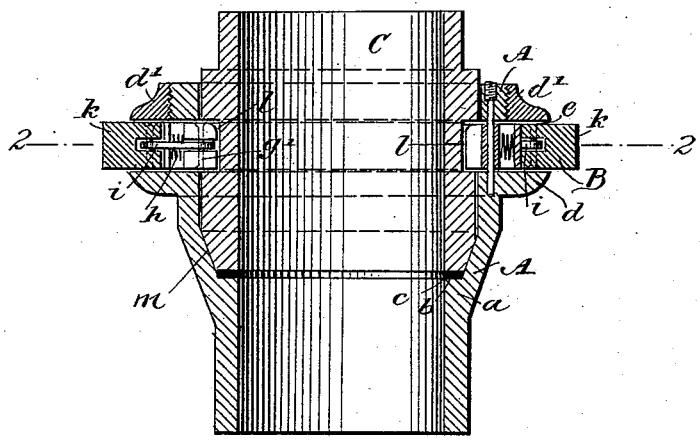
WITNESSES:
Paul Johel
E. M. Clark
INVENTOR
W. D. Patterson
BY
Mann & Co.
ATTORNEYS.

UNITED STATES PATENT OFFICE.

WILLIAM D. PATTERSON, OF KEOKUK, IOWA.

HOSE-COUPLING.

SPECIFICATION forming part of Letters Patent No. 464,386, dated December 1, 1891.

Application filed September 1, 1891. Serial No. 404,416. (No model.)

*To all whom it may concern:*

Be it known that I, WILLIAM D. PATTERSON, of Keokuk, in the county of Lee and State of Iowa, have invented a new and Improved Hose-Coupling, of which the following is a specification, reference being had to the annexed drawings, forming a part thereof, in which—

Figure 1 is a longitudinal section of my improved hose-coupling. Fig. 2 is a transverse section taken on line 2 2 in Fig. 1, showing the coupler closed; and Fig. 3 is a transverse section on the same section-line, showing the coupling released.

Similar letters of reference indicate corresponding parts in all the views.

The object of my invention is to produce a simple and efficient coupling for connecting lengths of hose, which may be connected instantaneously and readily disconnected.

My invention consists in a coupling formed of an outer and inner portion, the outer portion being provided with a circumferential groove containing a movable ring, and spring-actuated latches pivoted in the outer portion and adapted to enter an annular groove in the inner portion, the said latches being connected by links with the ring of the outer portion, so that by turning the ring the latches may be withdrawn and the inner portion released, all as will be hereinafter more fully described. The outer portion A of the coupling is bored in two diameters, connected by a conical portion $a$ and a shoulder $b$. An elastic packing $c$ rests upon the shoulder $b$. The larger part of the outer portion A of the coupling is furnished with a collar $d$, formed integrally with the coupling, and a collar $d'$ is screwed on the coupling. Between the collars $d\ d'$ is a groove $e$, in which is placed the ring B.

In diametrically-opposite sides of the part A and opposite the groove $e$ are formed mortises $f$, in which are pivoted the latches $g\ g'$, which are oppositely arranged with respect to each other. The said latches $g\ g'$ are pressed forward by spiral springs $h$, and the outward movement of each latch is limited by a link $i$, pivoted in a recess $j$ in the ring B, and also pivotally connected with the free end of the latch $g$.

In one side of the portion A of the coupling is formed a recess $a'$, between one end wall of which and a lug $b'$, projecting from the ring B into the recess, is held a spiral spring $a^2$, which spring normally acts to hold the ring B in the position shown in Fig. 2. The ring B is furnished with lugs $k$, located over the recesses $j$, which lugs are adapted to receive a spanner or wrench for turning the ring.

The inner portion C of the coupling is furnished with a circumferential groove $l$ for receiving the latches $g\ g'$. The inner end of the part C is provided with a beveled surface $m$, and the outer end is reduced in diameter to receive the hose. The free ends of the latches are beveled on their outer edges for engagement with the beveled surface $m$ of the part C, so that when the part C is inserted in the part A the latches will be pushed back and will drop into the groove $l$ in the inner portion of the coupling. To release the coupling the ring B is turned, thereby causing the latches $g\ g'$ to be drawn outwardly by means of the links $i$ and the spring $a^2$ to be compressed, as shown in Fig. 1, whereupon the part C may be drawn out, the spring $a^2$ then reacting and causing the ring to assume the position shown in Fig. 2.

Having thus described my invention, I claim as new and desire to secure by Letters Patent—

1. A coupling formed of two parts, one part being furnished with the spring-pressed latches $g\ g'$, the spring-pressed ring B, and links $i$, the other part being grooved circumferentially and adapted to receive the spring-pressed latches, substantially as specified.

2. A coupling formed of the parts A C, the part A being furnished with the collars $d\ d'$, the spring-pressed latches $g\ g'$, pivoted in mortises in the part A, the spring-pressed ring B, placed between the collars $d\ d'$, and the links $i$, pivoted in the ring B and connected with the latches $g\ g'$, substantially as specified.

WILLIAM D. PATTERSON.

Witnesses:
I. N. TICHENOR,
J. G. GARRETSON.